(12) United States Patent
Okitsu et al.

(10) Patent No.: US 7,612,323 B2
(45) Date of Patent: Nov. 3, 2009

(54) OPTICAL ELEMENT FOR CONDENSING INCIDENT LIGHT

(75) Inventors: Masahiro Okitsu, Suita (JP); Kazuyuki Ogura, Yao (JP); Kenji Konno, Sakai (JP); Hiroshi Hatano, Hachioji (JP)

(73) Assignee: Konica Minolta Opto, Inc., Tokyo (JP)

(*) Notice: Subject to any disclaimer, the term of this patent is extended or adjusted under 35 U.S.C. 154(b) by 7 days.

(21) Appl. No.: 11/239,694

(22) Filed: Sep. 28, 2005

(65) Prior Publication Data

US 2006/0082875 A1  Apr. 20, 2006

(30) Foreign Application Priority Data

Oct. 1, 2004  (JP)  ............... 2004-290705

(51) Int. Cl.
*H01J 3/14* (2006.01)
*H01J 5/16* (2006.01)

(52) U.S. Cl. ............... 250/216; 977/862; 359/448

(58) Field of Classification Search ......... 250/216, 250/201.3, 234, 307, 306; 359/558–576, 359/385–390, 656–661, 719–721, 726, 728, 359/732, 738, 739, 741, 448; 385/129; 369/13.32, 369/112.27, 112.23–112.26, 13.33; 977/862, 977/868, 874, 943
See application file for complete search history.

(56) References Cited

U.S. PATENT DOCUMENTS

| | | | |
|---|---|---|---|
| 4,803,700 A | 2/1989 | Dewey et al. | |
| 4,817,167 A | 3/1989 | Gassmann | |
| 4,926,130 A | 5/1990 | Weaver | |
| 4,944,025 A | 7/1990 | Gehring | |
| 4,975,699 A | 12/1990 | Frey | |
| 5,251,218 A | 10/1993 | Stone et al. | |
| 5,263,194 A | 11/1993 | Ragan | |
| 5,544,200 A | 8/1996 | An | |
| 5,602,820 A * | 2/1997 | Wickramasinghe et al. | . 369/126 |
| 5,640,698 A | 6/1997 | Shen et al. | |
| 5,826,180 A | 10/1998 | Golan | |
| 5,828,955 A | 10/1998 | Lipowski | |

(Continued)

FOREIGN PATENT DOCUMENTS

JP  2000-293877  10/2000

(Continued)

*Primary Examiner*—Thanh X Luu
*Assistant Examiner*—Francis M Legasse, Jr.
(74) *Attorney, Agent, or Firm*—Brinks Hofer Gilson & Lione (57) ABSTRACT

To obtain an optical element for generating near-field light which can accurately detect positions of a plurality of minute structures formed on a metallic thin film provided to a condensing surface, and a method of adjusting an optical spot position of the optical element. The metallic thin film is formed on the condensing surface of the optical element that condenses incident light so as to generate near-field light smaller than an condensing spot B near a condensing point, and a plurality of openings (minute structure) for generating the near-field light are formed into a matrix matter on the metallic thin film, and position detecting structures are formed on positions that partitions the openings is formed. Scanning in X and Y directions is carried out by a light beam, and its reflected light is detected so that the positions of the openings are detected.

3 Claims, 6 Drawing Sheets

U.S. PATENT DOCUMENTS

| | | |
|---|---|---|
| 6,392,978 B1 | 5/2002 | Sato |
| 6,528,780 B1 | 3/2003 | Mitsuoka et al. |
| 6,649,901 B2 * | 11/2003 | Thio et al. .................. 250/216 |
| 6,707,026 B2 | 3/2004 | Hatano et al. |
| 6,834,027 B1 * | 12/2004 | Sakaguchi et al. ....... 369/13.32 |
| 6,982,844 B2 * | 1/2006 | Rettner et al. .................. 360/59 |
| 7,085,220 B2 * | 8/2006 | Fujikata et al. ............. 369/118 |
| 7,315,426 B2 * | 1/2008 | Kim et al. ................... 359/738 |
| 2006/0245333 A1 * | 11/2006 | Ovshinsky et al. ..... 369/112.23 |
| 2007/0253051 A1 * | 11/2007 | Ishihara et al. .............. 359/212 |

FOREIGN PATENT DOCUMENTS

| | | |
|---|---|---|
| JP | 2001-067685 | 3/2001 |
| JP | 2002-236087 | 8/2002 |
| JP | 2003-287656 | 10/2003 |

* cited by examiner

OPTICAL ELEMENT FOR CONDENSING INCIDENT LIGHT

The present application claims priority to Japanese Patent Application No. 2004-290705 filed on Oct. 1, 2004, the entire contents of which are hereby incorporated by reference.

BACKGROUND OF THE INVENTION

1. Field of the Invention

The present invention relates to an optical element that creates a minute optical spot using a minute structure and an optical spot position adjusting method. Specifically, the invention relates to the optical element that is used for recording and/or reproducing information using near-field light, and the optical spot position adjusting method in the optical element.

2. Description of the Related Art

In recent years, in optical recording and reproducing techniques, the use of a near-field light generating structure is variously proposed in order to obtain a minute optical spot. In order to realize the recording/reproduction using near-field light, a solid immersion lens or a solid immersion mirror is used as a condensing element, and a minute spot is made to be close to a recording medium so that an evanescent wave and the recording medium interact with each other. As a result, recording or reproducing density of information is heightened.

Since near-field light is generated on a condensing surface of the optical element such as the solid immersion lens or the solid immersion mirror, a minute structure whose size is not more than 1 μm is formed, and thus a condensing spot of a light beam should be accurately matched with the minute structure.

For this reason, Japanese Patent Application Laid-Open No. 2000-293877 discloses that a plurality of photodiodes are formed around a minute structure provided to a condensing surface of an optical element, and a light beam is emitted to the optical element so that an emitted position of the light beam is adjusted based on a detected result by means of the photodiodes. Further, Japanese Patent Application Laid-Open No. 2002-236087 discloses that a minute structure is formed on a metallic thin film provided to a condensing surface of an optical element, a light beam is emitted to the optical element so that its reflected light is detected, and intensity of the reflected light is adjusted so as to be minimum.

In recent years, an optical element, where a plurality of minute structures are formed on a metallic thin film provided to a condensing surface and an optical spot is matched with any one of the minute structures in order to facilitate position adjustment of the optical spot, is proposed.

In the adjusting method disclosed in Japanese Patent Application Laid-Open No. 2000-293877, a plurality of photodiodes are formed around the minute structure, but since the minute structures have size of not more than 1 μm and the gap therebetween is not more than 2 μm, there is a problem that no a space where the photodiodes are formed around the minute structures.

Further, in the adjusting method disclosed in Japanese Patent Application Laid-Open No. 2002-236087, when a plurality of minute structures are formed on the metallic thin film which is formed uniformly, the intensity of the reflected light is hardly different between the thin film portion and the minute structures, and thus there is a problem that the positions of the minute structures cannot be actually detected.

SUMMARY OF THE INVENTION

It is a main object of the present invention to provide an optical element for generating near-field light that is capable of accurately detecting positions of a plurality of minute structures formed on a metallic thin film provided to a condensing surface.

In order to achieve the above object, an optical element of the present invention that condenses incident light so as to generate near-field light which is smaller than a condensing spot near a condensing point, is characterized in that a plurality of near-field light generating minute structures are formed near the condensing point, and a position detecting minute structure that detects positions of the near-field light generating minute structures is formed.

In the optical element of the present invention, an optical spot may be matched with any one of a plurality of the near-field light generating minute structures, and the position detecting minute structures are formed separately from the near-field light generating minute structures. For this reason, even if the near-field light generating minute structures cannot be detected, their positions can be accurately detected based on detected values of the position detecting minute structures.

In the optical element according to a first invention, it is preferable that the near-field light generating minute structures and the position detecting minute structures are formed on the metallic thin film. When such kinds of the minute structures are created, a plurality of the minute structures can be formed on the metallic thin film simultaneously, accurately and easily by conventionally-known minute processing. Since the metallic thin film has high reflectance of light, a portion that makes light to transmit and a portion where the metallic thin film is present can be detected easily.

In the optical element according to the first invention, it is preferable that the minute structure pattern generates plasmon resonance. Since an electric field is amplified by surface excitation plasmon polariton, although minute near-field light is generated, optical recording/reproduction with very high efficiency is enabled.

Further, in the optical element according to the first invention, it is preferable that the near-field light generating minute structures have more minute than wavelength to be used, and the position detecting minute structures are composed of a structure larger than the wavelength to be used. In the case of reflected light from the structure larger than the wavelength to be used, a detected value of the reflected light becomes larger, and thus the position detecting minute structure can be easily found.

In the optical element according to the present invention, it is preferable in processing that the plural near-field light generating minute structures are arranged into a matrix pattern. In the case where the near-field light generating minute structures are arranged into the matrix pattern, when the position detecting minute structures are constituted so as to surround the near-field light generating minute structures, a relative position relationship of the minute structures is easily understood. Further, when one near-field light generating minute structure is present in a position surrounded by the position detecting minute structures, the relative position relationship is understood more easily. Even if the near-field light generating minute structures are not surrounded, when the position detecting minute structures are present in the positions which partition the near-field light generating minute structures, the approximately same effect can be obtained.

It is another object of the present invention to provide a method of easily adjusting a position of the condensing spot to the near-field light generating minute structures formed near the condensing position of the optical element.

In a second invention, when the vicinity of the condensing position of the optical element having the position detecting minute structures and the near-field light generating minute structures is scanned by a light beam, the positions of the position detecting minute structures are detected, and the positions of the near-field light generating minute structures are detected from the positions of the position detecting minute structures.

In the position adjusting method according to the second invention, when scanning in two directions on the surface perpendicular to the optical axis is carried out by a light beam, a scanning mechanism is simplified, and the relative position relationship between the detected reflected light and the near-field generating minute structures becomes preferably easy.

In the position adjusting method according to the second invention, the position detecting minute structures that generate the reflected light surround the near-field light generating minute structures, and the near-field light generating minute structures are arranged so as to be positioned at approximately center of the surrounded areas. As a result, the relative position relationship between the detected reflected light and the near-field light generating minute structures becomes preferably easier.

According to the position adjusting method, the near-field light generating minute structures can be located to the optical spot easily.

The present invention itself, together with further objects and attendant advantages, will best be understood by reference on the following detailed description taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENTS

An optical element and an optical spot position adjusting method according to the present invention are explained below with reference to the drawings, but the present invention is not limited to embodiments.

Figure 1:
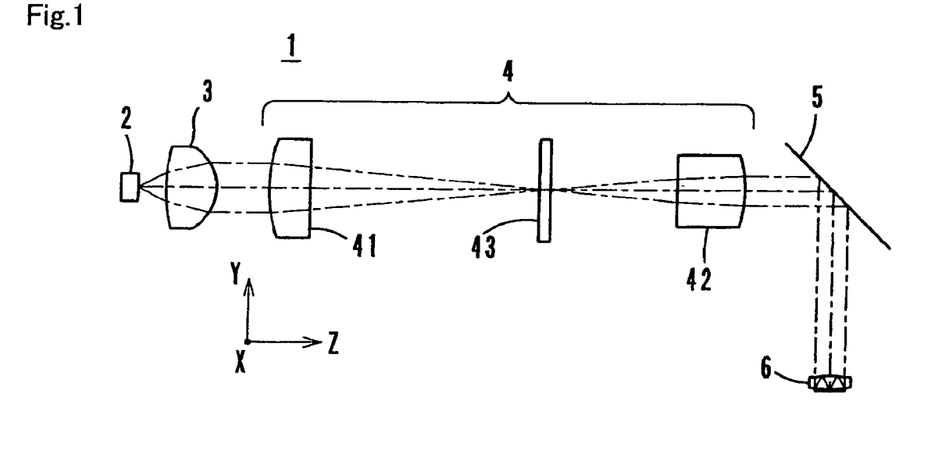
FIG. 1 is a schematic constitutional diagram illustrating one example of an optical device for optical recording having an optical element according to the present invention.

An optical device for optical recording having the optical element according to the present invention is explained. The optical device for optical recording 1 is, as shown in FIG. 1, composed of a laser diode 2 as a light source, a collimating lens 3, a beam diameter converting optical system 4, a plane mirror 5 and a condensing element 6 as an optical element for generating near-field light.

The laser diode 2 radiates divergent light with predetermined wavelength to an optically axial direction Z. The collimating lens 3 converts diffuse light radiated from the laser diode 2 into approximately parallel light. The beam diameter converting optical system 4 is composed of a first lens 41 as a convex lens, a second lens 42 as a convex lens and a diaphragm 43, and it converts a beam diameter of the parallel light emitted from the collimating lens 3.

The plane mirror 5 reflects the beam emitted from the beam diameter converting optical system 4 so as to lead it to the condensing element 6. The condensing element 6 condenses a parallel beam emitted from the mirror 5 so as to generate near-field light which is smaller than a condensing spot in a vicinity of a condensing point. Its concrete constitutional example is explained below with reference to FIGS. 3 and 4.

In the beam diameter converting optical system 4, a distance between the first and the second lenses 41 and 42 is set so that a principal point gap becomes the sum of focal point distances of the lenses 41 and 42. An absolute value of magnification $\beta$ is determined by a ratio of the focal point distances, and the magnification $\beta$ is set within a range of $0.2<|\beta|<0.8$, and the optical system 4 is composed as a reducing optical system.

Figure 2:
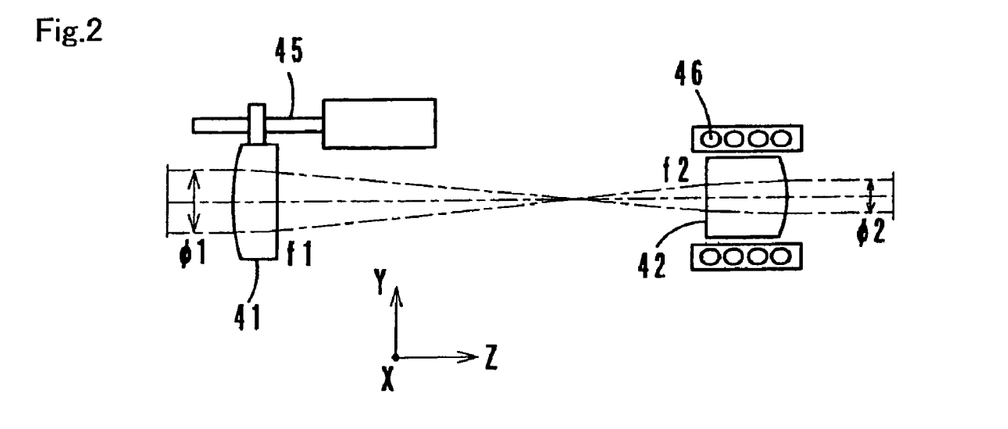
FIG. 2 is an explanatory diagram illustrating a beam diameter converting optical system in the optical device for optical recording.

Further, as shown in FIG. 2, the position of the first lens 41 of the beam diameter converting optical system 4 can be adjusted to the optically axial direction Z by a piezoelectric actuator 45. The position of the second lens 42 can be adjusted to directions X and Y which are perpendicular to the optically axial direction Z by a moving coil 46.

When the gap between the first and second lenses 41 and 42 is changed, a curvature radius of a wave front of the emitted light can be controlled. Such kind of control is necessary because the optical device for optical recording 1 uses the single condensing element 6 (including joint or complex structure), and thus the condensing element 6 does not have a focusing function. That is to say, when a focus position slightly changes due to a manufacturing error of the condensing element 6 and the condensing spot shifts from a design condensing position, the focus position cannot be changed in the condensing element 6 having the single structure.

The beam diameter converting optical system 4, therefore, needs to control incident light to the condensing element 6. The gap between the lenses 41 and 42 is adjusted by driving the first lens 41 to the optically axial direction Z by means of the piezoelectric actuator 45 (see FIG. 2).

Since the condensing spot of the condensing element 6 is a single element, the condensing spot is determined by an incident angle of the beam. In the optical device for optical recording 1, an angle of the mirror 5 and holding of the condensing element 6 have an error, the position of the condensing spot shifts from a predetermined position (optical axis of the condensing element 6).

In order to cope with the shift of the condensing spot from the optical axis, the incident angle of the beam with respect to the condensing element 6 may be adjusted. Concretely, the first or second lens 41 or 42 may be moved to the X direction and the Y direction which are perpendicular to the optical axis. That is to say, when the first lens 41 (or second lens 42) is moved to the direction vertical to the optical axis, the incident angle to the condensing element 6 can be adjusted. When a moving amount (eccentricity amount) is designated by y, an angle $\theta$ is determined by an expression $y=f\cdot\tan\theta$ (f is a focal point distance of the lens to be moved).

A solid immersion mirror or a solid immersion lens is singularly used, or a joint element composed of such a lens or a mirror and a translucent flat plate is used as the condensing element 6. Concrete constitutional examples of the mirror type condensing element 6 are shown in FIGS. 3A to 3D, and concrete constitutional examples of the lens type condensing element 6 are shown in FIGS. 4A and 4B. In FIGS. 3A to 3D, 100 designates a recording medium.

Figure 3A:
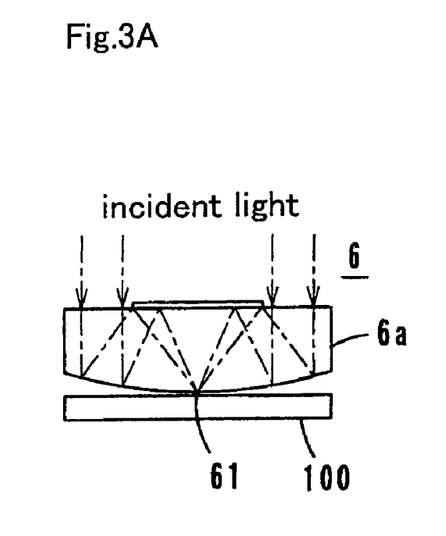
FIGS. 3A to 3D are explanatory diagrams illustrating first to fourth examples of a condensing element.
Figure 4A:
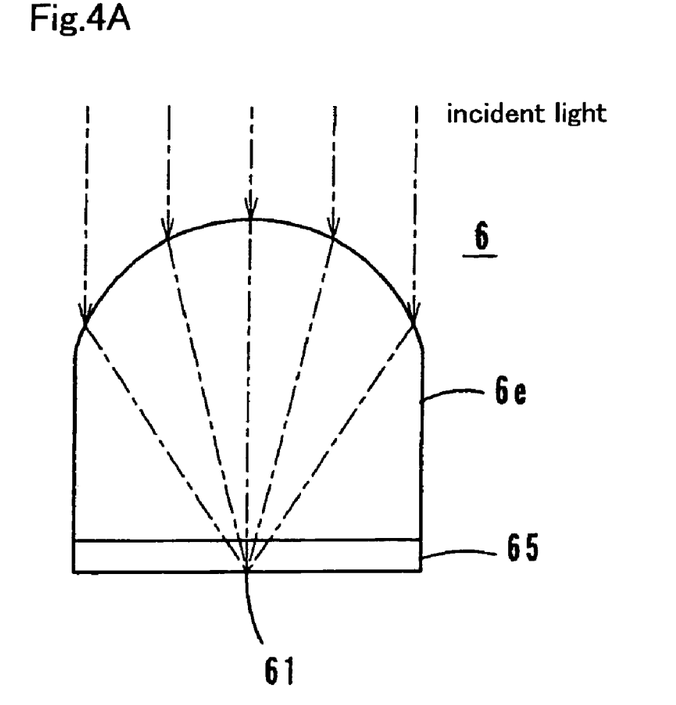
FIGS. 4A and 4B are explanatory diagrams illustrating fifth and sixth examples of the condensing element.
Figure 4B:
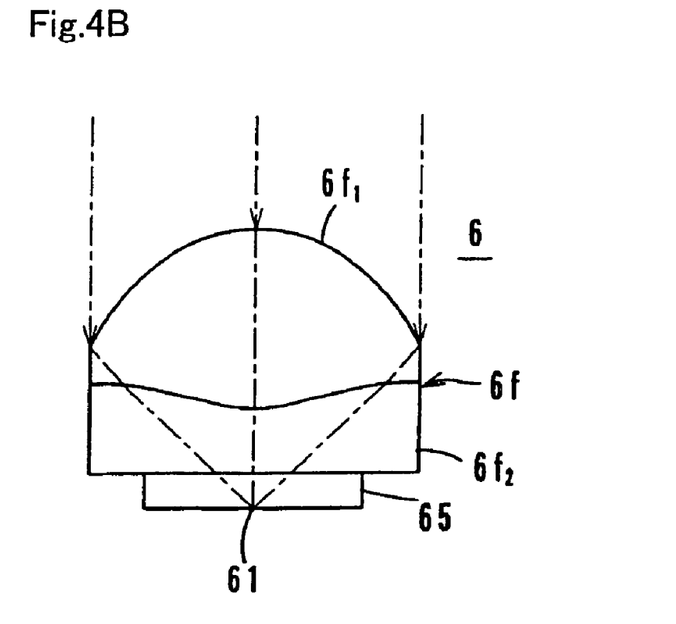

The condensing element 6 shown in FIG. 3A is a solid immersion mirror 6a. The solid immersion mirror 6a reflects incident light from orbicular zone portion of a plane type first surface from a second surface as an aspherical surface, and further reflects the light from a reflecting surface on a first surface so as to condense it to the condensing spot 61 and emit near-field light.

Figure 3B:
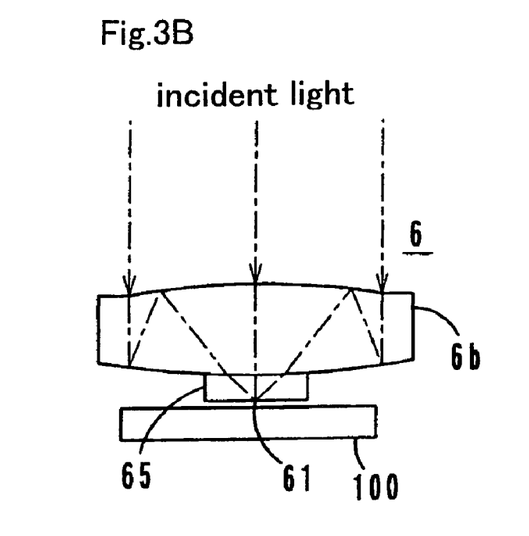

The condensing element 6 shown in FIG. 3B is constituted by jointing a solid immersion mirror 6b to a translucent flat plate 65. The condensing element reflects incident light which transmits through a first surface having a positive power from a second surface having a positive power. Further, the condensing element 6 reflects the light from the first surface and condenses it to the condensing spot 61 near the second surface of the translucent flat plate 65 jointed to a center plane portion of the second surface so as to generate near-field light.

Figure 3C:
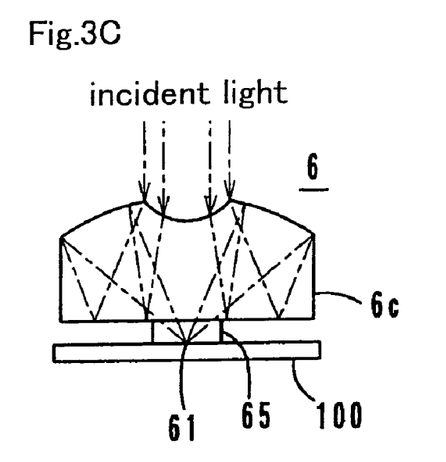

The condensing element 6 shown in FIG. 3C is constituted by jointing a solid immersion mirror 6c to the translucent flat plate 65. The condensing element 6 refracts incident light from a concave portion of the first surface (aspherical surface) at the concave portion, and reflects the light from the second surface as the plane and reflects it from the first surface (aspherical surface). The condensing element 6 condenses the light to the condensing spot 61 near the second surface of the translucent flat plate 65 jointed to the center of the second surface so as to generate near-field light.

Figure 3D:
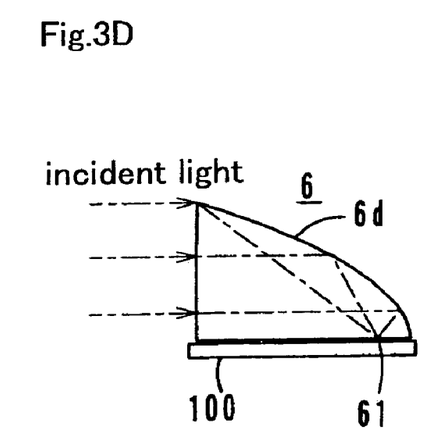

The condensing element 6 shown in FIG. 3D is a solid immersion mirror 6d. The condensing element 6 reflects incident light which transmits through a first surface as a vertical plane from a reflecting surface formed as a paraboloid, for example, and condenses the light to the condensing spot 61 on a second surface as a horizontal plane so as to generate near-field light. When such solid immersion mirror 6d is used, the mirror 5 is not necessary.

The condensing element 6 shown in FIG. 4A is a continuous aspherical surface whose incident surface has a convex shape, and is composed of a solid immersion lens (aspherical lens) 6e whose emission surface is plane, and a translucent flat plate 65 which is jointed to the plane of the solid immersion lens 6e. The beam which enters the solid immersion lens 6e is refracted by an incident surface (aspherical surface), transmits through the plane as the joint surface, and is condensed to the condensing spot 61 near the emission surface of the translucent flat plate 65 so that near filed light is generated.

The condensing element 6 shown in FIG. 4B is constituted by jointing a solid immersion lens 6f to the translucent flat plate 65. The solid immersion lens 6f is composed of a first lens 6f1 made of a first material having refractive index N1, and a second lens 6f2 made of a second material having refractive index N2. Countered surfaces of the lenses 6f1 and 6f2 are jointed so as to have the same shape. The beam which enters the first lens 6f1 is refracted by the incident surface (aspherical surface), transmits through the second lens 6f2, and is condensed to the condensing spot 61 near the emission surface of the translucent flat plate 65 so that near-field light is generated.

When the condensing element 6 is constituted by jointing the lens or the mirror to the translucent flat plate 65, since they are jointed, the condensing element 6 has an advantage such that it is resistant to disturbance. Further, when the condensing element 6 is designed for infinite matter, it has an advantage such that the focus position hardly fluctuate with respect to a relative shift with respect to the incident light.

The object of jointing the lens or the mirror to the flat plate 65 is that mass production of the minute structure is enabled. That is to say, the emission surface of the flat plate 65 is formed with the minute structures for generating the near-field light as explained below. Such kind of the minute structures is generally formed on a wafer by minute processing. The minute structures are formed on a mother board by the processing, and it is cut into the flat plate 65 with predetermined size so that the mass production is enabled inexpensively.

The condensing spot 61 of the condensing element 6 is formed with the minute structures for generating near-field light having a dimension of not more than incident wavelength. Such minute structure preferably generates surface excitation plasmon, and particularly it is manufactured by metal that generates plasmon resonance.

Even if the minute structures have dimension of not more than wavelength, energy should be collected efficiently, and when an electric field amplifying effect due to the surface excitation plasmon resonance is utilized, satisfactory condensing efficiency can be obtained. For example, it is known that gold or silver has the great electric field amplifying effect at wavelength of 780 nm, and aluminum or magnesium has the great electric field amplifying effect at wavelength of 405 nm. When a metallic material, a minute structure and its thickness are selected according to the incident wavelength, the plasmon resonance can be effectively utilized, so that a minute spot can be obtained efficiently.

Figure 5:
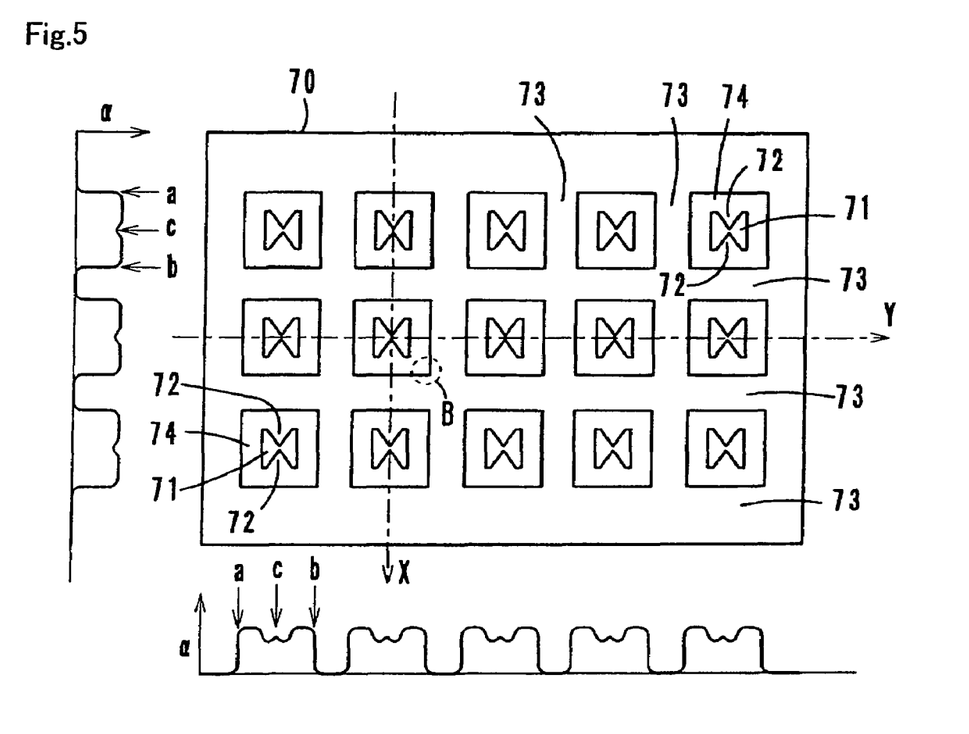
FIG. 5 is an explanatory diagram illustrating one example of a minute structure pattern and a position detecting pattern.

FIG. 5 illustrates a concrete example of the minute structure. The minute structure is formed in a manner that a metallic thin film with thickness of about 50 nm is formed on a condensing area 70 of the element 6 and a plurality of openings having butterfly shape (near-field light generating minute structure) 71 are formed into a matrix pattern on the metallic thin film. A gap between minute protrusions 72 opposite at the opening 71 is, for example, 20 to 50 nm, and when light is condensed on countered portions of the minute protrusions 72, a strong electric field is generated only on the vicinities of the countered portions, so that the near-field light is generated.

The condensing area 70 is formed with a position detecting minute structure 73 in positions that partitions gaps between the openings (near-field light generating minute structure) 71 arranged into the matrix pattern. That is to say, the openings (near-field light generating minute structure) 71 and the position detecting minute structures 73 are formed by removing the metallic thin film according to the minute processing, and a left metallic thin film is designated by reference numeral 74.

When the thickness of the metallic thin film 74 to be formed on the condensing area 70 and the minute structures of the openings 71 are optimized, the electric field can be efficiently concentrated in a minute area, and optical recording/reproducing can be carried out in the minute area by utilizing the near-field light. Only one minute structure may be formed, but a plurality of the minute structures are arranged into the matrix pattern as mentioned above, so that the condensing spot position may be adjusted to any one of the minute structures. This facilitates the adjustment.

Figure 6:
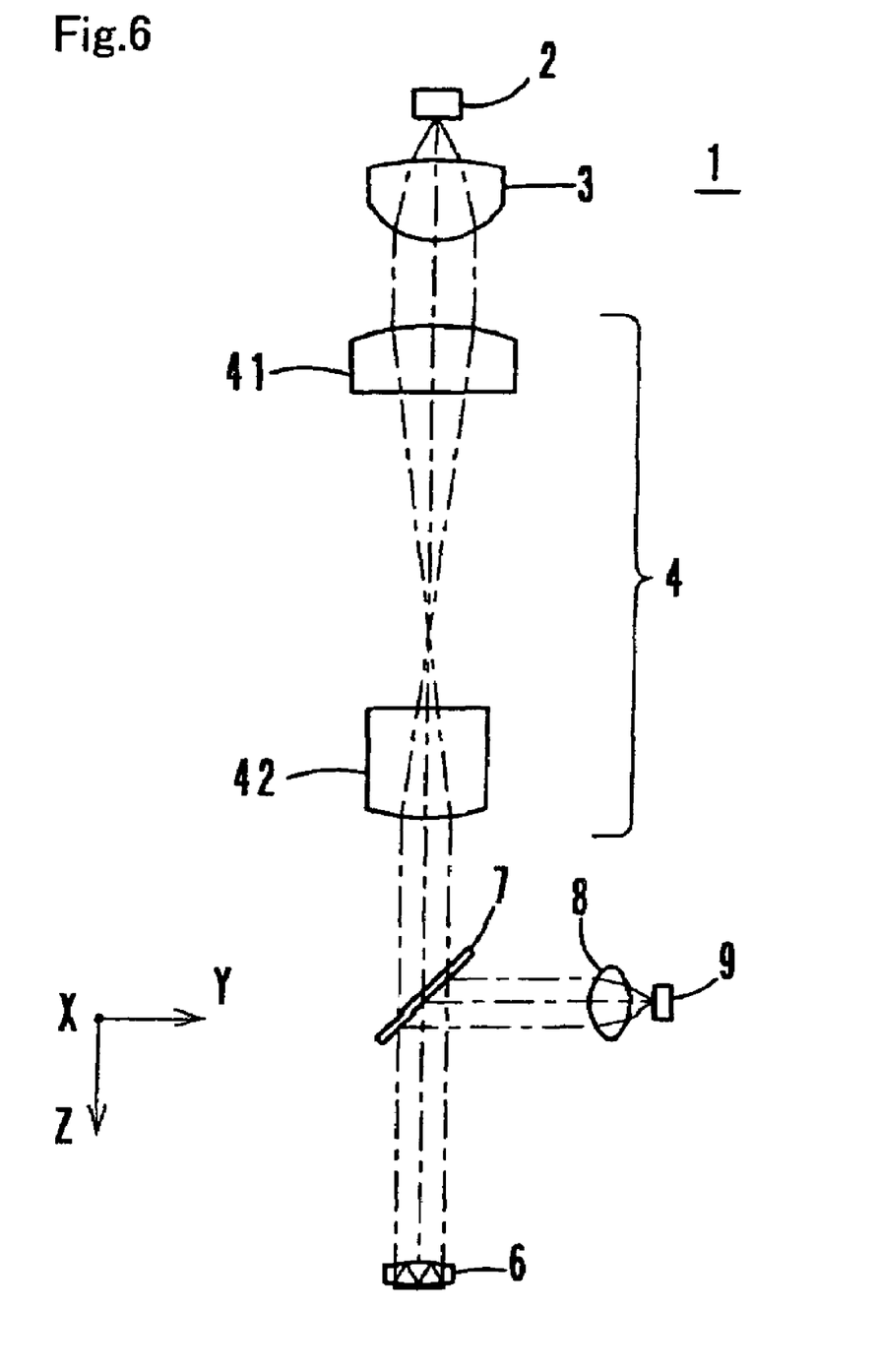
FIG. 6 is a schematic constitutional diagram for explaining position detection of the minute structure pattern.

For this reason, it is necessary to accurately detect the positions of the openings 71 where the light is condensed in advance. As shown in FIG. 6, therefore, a half mirror 7, a condensing lens 8 and a photodiode 9 are provided on an optical path of the optical device for optical recording 1. Reflected light from the condensing element 6 is detected, and the positions of the openings 71 are detected based on an output value from the photodiode 9.

Concretely, the lens 42 of the beam diameter converting optical system 4 is moved to the optically axial direction Z, the vertical X direction and Y direction, and a light beam emitted from the laser diode 2 is scanned in the X and Y directions. The reflected light is detected by the photodiode 9 via the half mirror 7 and the condensing lens 8 and sampled.

A schematic size of an optical beam spot B is as shown in FIG. 5, and the position detecting minute structures 73 have a structure which is sufficiently larger than wavelength to be used. When the scanning in the X and Y directions is carried out at the spot B, an output α from the photodiode 9 becomes relatively high in the case where the metallic thin film 74 is irradiated with the light beam, and the output α becomes relatively low in the case where the position detecting minute structures (glass portion) are irradiated with the light beam. When the openings 71 are irradiated, the output α becomes slightly lower than the case where the metallic thin film 74 is irradiated.

Waveforms shown on the left side and the lower side of FIG. 5 show outputs from the photodiodes 9 at the time of scanning in the X direction and the Y direction, respectively. The output α abruptly rises (see reference symbol a) and abruptly falls (see reference symbol b) at a boundary between the position detecting minute structure 74 and the metallic thin film 74. A slightly fallen portion of the output α at a high output portion (see reference symbol c) corresponds to the opening 71.

The openings 71 are, therefore, present on the scanning line with waveform having the fallen portions c, and when a middle point between the rise portion a and the fall portion b of the output α on the scanning line is calculated, the positions of the openings 71 can be detected accurately. Not all the positions of the fall portions c can be accurately detected, but the rise portions a and the fall portions b can be accurately detected, and the positions of the openings 71 can be detected accurately based on this detection. In the case of the scanning in the X and Y directions, when the position detecting minute structures are present in the positions that partition the X and Y directions of the openings, the positions of the openings can be detected. For this reason, the position detecting minute structures do not have to completely surround the near-field light generating minute structures. When the positions of the openings 71 are detected, the lens 42 of the beam diameter converting optical system 4 is moved to the X direction and/or the Y direction so that the optical spot is condensed on those positions.

The optical element and the optical spot position adjusting method of the present invention are not limited to the above embodiment, and can be variously changed within the scope of the gist.

Particularly, detailed constitutions of the collimating lens and the beam diameter converting optical system are arbitrary, the condensing element can have various constitutions. Further, the minute structures that generate near-field light and the position detecting minute structures shown in FIG. 5 are only examples, and their constitutions and details are arbitrary. Besides the constitution such that the minute structures are formed on the transparent flat plate, the minute structures may be formed directly on the condensing surface of the solid immersion lens and or solid immersion mirror.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. A method for adjusting the position of a condensing spot relative to a near-field light generating minute structure formed near the condensing position of an optical element, comprising the steps of:
    scanning a surface of the optical element perpendicular to an optical axis by a light beam;
    detecting the position of position detecting minute structures formed outside of the near-field light generating minute structure; and
    detecting the position of the near-field light generating minute structure based on a change of reflectance of incident light, the near-field light generating minute structure, which includes:
        a first area configured to provide a high reflectance of the incident light; and
        an opening within the first area configured to provide a slightly lower reflectance of the incident light than is provided by the first area; wherein
    the change of reflectance of the incident light from the position detecting minute structures to the first area, and from the first area to the opening, facilitates detecting the position of the near-field light generating minute structure.

2. A method of adjusting of claim 1, wherein the scanning is carried out in two directions perpendicular to each other.

3. A method of adjusting of claim 1, wherein the near-field light generating minute structures are arranged so as to be positioned at approximately center of the position detecting minute structures.

* * * * *